(No Model.)
J. J. RICKETTS.
VENTILATOR FOR GAS MAINS.
No. 320,002. Patented June 16, 1885.
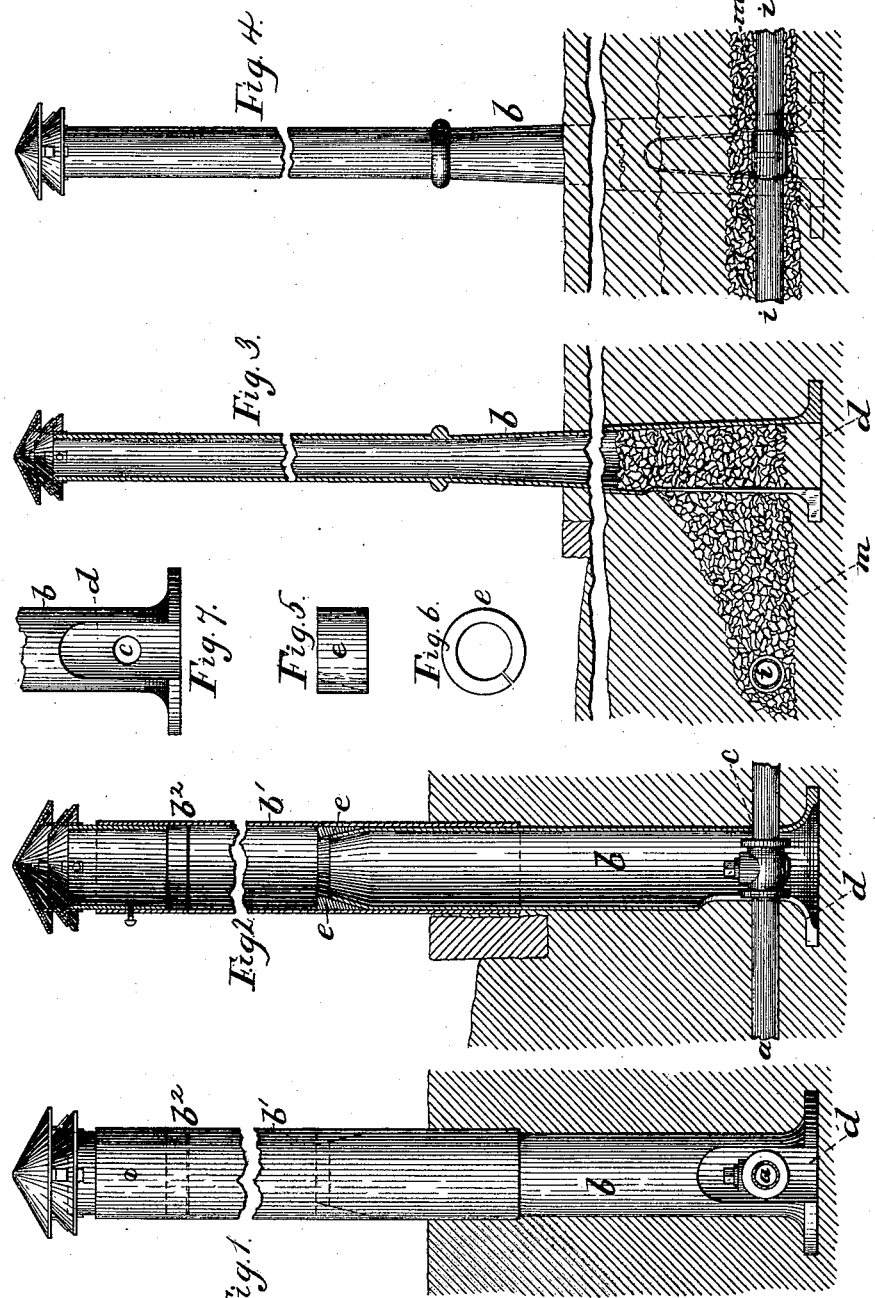
Witnesses.
Inventor.

UNITED STATES PATENT OFFICE.

JAMES J. RICKETTS, OF PITTSBURG, PENNSYLVANIA.

VENTILATOR FOR GAS-MAINS.

SPECIFICATION forming part of Letters Patent No. 320,002, dated June 16, 1885.

Application filed January 14, 1885. (No model.)

*To all whom it may concern:*

Be it known that I, JAMES J. RICKETTS, of Pittsburg, in the county of Allegheny and State of Pennsylvania, have invented a new and useful Improvement in Ventilators for Gas-Mains; and I do hereby declare the following to be a full, clear, and exact description thereof.

Great difficulty has been experienced in the application of natural gas to use in cities, where the gas-mains have to be placed underground, owing to the fact that leaks are apt to occur, and by collecting in deposits or percolating into the cellars of dwellings to poison the air or occasion destructive explosions. This liability is due to the subtle nature of the gas, which will escape through joints in pipes quite sufficient to retain manufactured illuminating-gas. The soil adjacent to a buried gas-main is always more or less loose and spongy, because of the difficulty in packing it, and consequently the leaking gas from the main will follow it throughout its length, and where the service-pipes branch will follow the loose soil surrounding the latter into the cellars of dwellings. It is the purpose of my invention to overcome this evil in the distribution of gas, and to provide a system for ventilating the gas-mains which will be at once simple and effective.

I will now describe my improvement, so that others skilled in the art may apply the same by reference to the accompanying drawings, in which—

Figure 1 is a rear view of my improvement applied to an underground gas-pipe. Fig. 2 is a side view of the same in vertical section. Fig. 3 is a sectional side view of a modification, and Fig. 4 is a front view of the same. Figs. 5 and 6 are views of a part, and Fig. 7 is a front view of a part, of the device shown in Fig. 1.

Like letters of reference indicate like parts in each.

In the drawings, $a$ represents a branch service-pipe, which leads from a gas-main to a house or series of houses. It is buried several feet under the level of the ground or street, as shown in the drawings. It has been usual to provide the gas-service pipes with stop cocks or valves, so that when desirable the gas may be shut off from the building at a point outside of it. These cocks are underground, but are inclosed by a box which reaches from the service-pipe to the surface of the ground, where they are ordinarily covered. When it is desired to reach the stop-cock, the cover of the box is removed, and the cock is turned by reaching it with a tool or with the arm of the operator. The purpose of these boxes has been simply to provide means for regulating the cock without digging the earth away above the pipe, so that in their application they have ordinarily been set over the cock without inclosing the pipe. My invention consists, partly, in constructing such a box so that it will fit around and inclose the gas-pipe to make a tight joint at one side, and in allowing the gas-pipe to enter the other side of the box loosely. Thus $b$ represents my improved box, consisting of a casing, preferably cylindriform, which extends from the pipe $a$ to or above the surface of the ground. On the side of the box nearest the building into which the gas is supplied is a circular hole, $c$, through which the pipe $a$ passes, and which fits snugly around the pipe. A ring of suitable packing is preferably used to make the joint between the pipe and the sides of the hole $c$ secure. The other side of the box through which the pipe enters from the main is provided with a slot or hole, $d$, which is of larger diameter than the pipe. It is preferably made by slotting the outer side of the box from the bottom to a point above the position of the pipe. The bottom of the box rests upon the solid and unbroken ground at the base of the pipe-ditch.

Thus constructed and applied, it will be apparent that the leaking gas from the main, following the line of the service-pipe, will enter the box through the large hole $d$, and, not being able to pass further, by reason of the closed hole $c$, and of the fact that the box rests on solid ground, will pass up the box into the open air. The gas will be perfectly free to enter the box, but cannot go beyond the same into the house.

If desired, the box $b$ may be applied to any underground gas-pipe, at a point separate from the situation of the stop-cocks, or it may be applied directly to the joints of any underground gas pipe or main to collect the leakage therefrom independently of a conduit leading from other joints or portions of the pipe.

In order to create a draft in the stop-cock box $b$, which will aid in drawing the gas away from the earth near the pipe, it is desirable to cause the box to extend some feet above the ground. I do this by adding to the box $b$, which projects a little above-ground, another tube or box, $b'$, which fits over or "telescopes" onto the main box, and can thus be raised or lowered thereon to form a continuous tube of proper length. After the tube $b'$ has been arranged at the desired height it is secured in position by means of an annulus, $e$. The top of the box $b$ is slightly tapered inwardly, as shown in the drawings, and the annulus $e$ is made of a diameter a little less than the diameter of the tube $b'$, and with its periphery wedge-shaped in cross-section. If this annular wedge be dropped from the top of the tube $b'$, so as to fit within the beveled space near the top of the box $b$ and between it and the tube $b'$, it will wedge or jam in the same and hold the latter tube securely. Being fastened on the inside, the parts cannot be disturbed by mischievous or curious persons. The form of annular wedge preferred by me is shown in the drawings, and has its periphery split or partly split. The result is, that when the annulus is dropped around the tapered end of the inner pipe its split will allow it to spread somewhat and to make a more perfect joint. A further security may be had by extending the lower end of the outer tube $b'$ underground, as shown in the drawings.

At the top of the tube $b'$ is placed a covered ventilator, $h$, of suitable construction, to create a better draft and to prevent rain or snow from entering and clogging the box.

The tube $b'$ may be provided with a grating, $b^2$, which will keep any stones or dirt which may be put into the tube by accident or design from falling upon the pipe at its base.

My improved ventilating stop-cock box may be made quite ornamental, and may advantageously be made of proper size and form to be used as a hitching-post for horses.

A modification of my improvement is shown in Figs. 3 and 4, in which, instead of utilizing the already formed conduit of loose soil around the service-pipe as a ventilator for the gas-main, I construct separate conduits on an analogous principle. Thus, $i$ being the gas-main, which is usually placed underground in the middle of the streets of cities, I dig trenches at different points along the main, leading thence to the curb of the sidewalk or other convenient point. These trenches are partially filled with loose broken stone or rubble, and are covered with tightly-packed earth, thereby constituting what are commonly known as "French drains." At the end of the French drain is placed a box, in some respects similarly constructed to the stop-cock box $b$ before described. The large opening $d$ faces toward the gas-main, and is in direct communication with the drain $m$; but the other side of the box is closed and has no pipe-hole $c$. The upper part of the box $b$, which communicates with the open air, is preferably made in the same manner as before described, though it may be conveniently made of a single metal tube, because there is no stop-cock at the base with which communication is desired. It is evident that in this case the leaking gas, which follows the main $i$, on reaching the drain $m$, will leave the main and follow the more open passage caused by the drain until it reaches the adit of the box $b$. Not being able to go farther underground, it will be drawn up the box and discharged into the open air.

If desired, the French drain may be applied to the modification first described by laying the service-pipes in a stone-filled drain from the main up to the stop-cock box $b$. The gas will then more readily leave the main and follow the branch service-pipes to the box-ventilators.

By the term "rubble," used by me in the claims, I mean, primarily, loose broken stone; but I desire also to cover by this term loose coke and blocks of any kind, and, generally, solid packing or matter having intercommunicating interstices.

I am aware that ventilating-pipes leading down to rubble arranged around the gas-main have been used before, and I do not desire to claim the same, as my invention differs from this arrangement in that the ventilating-box incloses either the gas-pipe itself or a conduit leading from around the gas-pipe, so that a direct passage for the escaping gas is formed not only to but into the box, inducing the escaping gas directly to the mouth of the box above the surface of the ground.

I do not desire to limit the scope of my invention to the employment of sectional ventilating-boxes; nor do I desire to limit myself to any particular form of conduit leading from the outer surface or space about the gas-main to the ventilating-box, or to the use of such conduit in connection with the box where the box is placed over a joint or stop-cock, in the manner described; but

What I claim as new, and desire to secure by Letters Patent, is—

1. A device for removing leaking gas from underground pipes, which consists of a box or tube through which the gas-pipe passes, said box or tube communicating with the open air, and fitting tightly around the gas-pipe at one side and loosely on the other side of the box, substantially as and for the purpose specified.

2. The combination of a ventilating-box, one of the buried sides of which is open, and a conduit leading from the space about the gas-pipe into the opening in the box, so that the box shall inclose the terminus of the conduit and shall interpose a wall opposite the open side to the lateral flow of the gas, substantially as and for the purpose specified.

3. The combination of a ventilating-box, one of the buried sides of which is open, and a conduit, consisting of a covered ditch containing rubble, leading from the space about the gas-pipe into the opening in the box, so that the box shall inclose the terminus of the conduit and shall interpose a wall opposite the open side to the lateral flow of the gas, substantially as and for the purpose specified.

4. A ventilating-box for underground gas-pipes, having passages at the bottom for the entrance and exit of the gas-pipe, the exit-passage being capable of making a tight joint around the pipe, and the adit-passage being open, so as to make a loose joint with the pipe, in combination with an auxiliary tube or box capable of fitting or telescoping on the ventilating-box, and a wedge for holding said tube or box in position, substantially as and for the purposes described.

5. A ventilating-box for underground gas-pipes, having passages at the bottom for the entrance and exit of the gas-pipe, the exit-passage being capable of making a tight joint around the pipe, and the adit-passage being open, so as to make a loose joint with the pipe, in combination with an auxiliary tube or box capable of fitting and telescoping on the ventilating-box, and a ventilating-cap, $h$, substantially as and for the purposes described.

In testimony whereof I have hereunto set my hand this 5th day of January, A. D. 1885.

JAMES J. RICKETTS.

Witnesses:
W. B. CORWIN,
JNO. K. SMITH.